(12) United States Patent
Waldner et al.

(10) Patent No.: US 7,730,851 B2
(45) Date of Patent: Jun. 8, 2010

(54) ANIMAL FEEDER DEVICE

(75) Inventors: Michael Waldner, Minnedosa (CA);
Michael George Waldner, Minnedosa (CA); Robert Jake Waldner, Minnedosa (CA)

(73) Assignee: Uplands Manufacturing Ltd., Minnedosa (CA)

( * ) Notice: Subject to any disclaimer, the term of this patent is extended or adjusted under 35 U.S.C. 154(b) by 208 days.

(21) Appl. No.: 12/114,912

(22) Filed: May 5, 2008

(65) Prior Publication Data

US 2008/0276873 A1 Nov. 13, 2008

Related U.S. Application Data

(60) Provisional application No. 60/916,393, filed on May 7, 2007.

(51) Int. Cl.
*A01K 5/00* (2006.01)
*A01K 7/06* (2006.01)
(52) U.S. Cl. .................. 119/51.5; 119/52.1; 119/53

(58) Field of Classification Search ............... 119/51.5, 119/52.1, 53, 51.01, 51.02, 54, 51.03, 53.5, 119/51.12, 57, 51.13, 57.4, 61, 72, 469, 479
See application file for complete search history.

(56) References Cited

U.S. PATENT DOCUMENTS

| | | | |
|---|---|---|---|
| 4,790,266 A | | 12/1988 | Kleinsasser et al. |
| 4,825,811 A | * | 5/1989 | O'Kelley .................. 119/51.5 |
| 5,570,656 A | * | 11/1996 | Waldner et al. ............ 119/53.5 |
| 6,192,831 B1 | | 2/2001 | Brunse |
| 6,843,206 B1 | | 1/2005 | Knippelmeir |
| 6,868,801 B2 | | 3/2005 | Rovira Badia et al. |
| 6,988,465 B2 | * | 1/2006 | Park ........................ 119/51.12 |

* cited by examiner

*Primary Examiner*—Yvonne R. Abbott
(74) *Attorney, Agent, or Firm*—Ade & Company Inc.; Ryan W. Dupuis; Kyle R. Satterthwaite

(57) ABSTRACT

An animal feeder device comprises a trough to receive water and a feed shelf to support particulate feed thereon supported spaced above the trough for accommodating access to a head of one of the animals to the trough. A feed hopper directs feed onto the shelf through a plurality of discharge chutes corresponding to respective feeding stations along the trough. Water is supplied to the trough by a level control arranged to maintain water level in relation to the trough at a set point level.

20 Claims, 11 Drawing Sheets

ANIMAL FEEDER DEVICE

This application claims the benefit under 35 U.S.C. 119(e) of U.S. provisional application Ser. No. 60/916,393, filed May 7, 2007.

FIELD OF THE INVENTION

The present invention relates to a device for feeding animals, for example hogs, in which a feed trough is provided.

BACKGROUND

When raising hogs, it is common to initially feed the hogs a feed mixture consisting of milk, sugar, whey and other ingredients. As milk is costly, it is desirable to reduce the milk content gradually over a period of a few weeks so that the hogs can subsequently be raised primarily on a feed mixture comprised of whey and other ingredients. The feed mixture is typically available in various forms including chop in which the feed mixture has a generally powder like consistency or crumbling in which the feed mixture is in a pellet form. Chop is desirable due to its ease of mixing and low cost to prepare; however in certain types of feeders when there is milk content in the chop, the chop does not flow suitably to the feed trough for access by the hogs. In such instances during the initial few weeks when there is milk content in the feed mixture it is generally known to be required to provide the feed mixture as crumbling in a pellet form for ease of dispensing despite the additional cost associated with manufacturing the feed mixture into a pellet form.

One example of a feeder unit for livestock, and in particular hogs is U.S. Pat. No. 4,790,266 belonging to Kleinsasser et al. in which a feed trough includes a shelf supported above the trough and a water supply below the shelf for directing water through valves actuated by the pig into the trough. A hopper positioned above the shelf directs material continuously onto the shelf to be retained on the shelf by the repose angle of the feed. The pig can thus eat directly from the shelf in a dry condition or can brush the feed into the through for mixing with the water and eating in a wet condition. In normal use the hopper is generally fixed relative to the shelf such that the feed mixture in the form of chop with milk content can plug up in the hopper. Furthermore the animal actuated water valves result on occasion that too much water is dispensed in an uncontrolled manner into the trough to spoil a considerable amount of food and waste water. Furthermore it is best if the feed is taken in a dry condition with the pig drinking as little water as possible since of course the water tends to fill the pig and reduce the amount that it wishes to eat.

U.S. Pat. No. 6,192,831 belonging to Brunse discloses a further example of a feeder with a dry feed shelf and a separate water compartment in which can be mixed with the feed, however the water supply relies again on animal actuation and accordingly no limitations are placed on the amount of water being dispensed so that excess water can overflow and cause considerable food and water spoilage as well as interfering with encouraging the pig to eat as much dry food as possible.

U.S. Pat. No. 6,868,801 to Rovira Badia et al. discloses a further example of a livestock feeding assembly in which a dry feed and wet feed area are provided, however water dispensing is again controlled by the animals without limitation so as to potentially cause food spoilage and overflowing of water.

U.S. Pat. No. 6,843,206 belonging to Knippelmeir discloses a water tray drinker for pigs comprising a tray which is divided into water compartments by divider walls of different height. An adjustable water supply mechanism including a vacuum valve can be adjustably positioned relative to the tray for automatically filling one or more of the compartment portions depending upon the vertical placement of the water supply mechanism. No feed trough is disclosed.

SUMMARY OF THE INVENTION

According to one aspect of the invention there is provided a feeder device for feeding particulate feed to animals, the device comprising:

a trough having a base and laterally opposed side edges spaced upwardly from the base and extending in a longitudinal direction between opposing ends;

a feed shelf having side edges and being positioned to extend in the longitudinal direction spaced above the base of the trough;

the side edges of the trough being positioned laterally outwardly in relation to the side edges of the shelf so as to be arranged to capture feed falling from the feed shelf;

a space between the side edges of the trough and the side edges of the feed shelf being arranged for accommodating access to a head of one of the animals;

a feed hopper above the feed shelf and arranged for containing the particulate feed;

at least one discharge chute extending downward from the hopper to a lower edge of the discharge chute and arranged for communicating the particulate feed therethrough to the feed shelf;

said at least one discharge chute being arranged to be supported in proximity to the feed shelf such that an angle of repose of the particulate feed from the lower edge of discharge chute to the feed shelf prevents the particulate feed from falling from the feed shelf;

a water supply arranged for supplying water to the trough;

a level control arranged to control the water supply to maintain water level in relation to the trough at a set point level.

According to a second aspect of the present invention there is provided a feeder device for feeding particulate feed to animals, the device comprising:

a trough having a base and extending from the base to an upper edge spaced upwardly from the base;

a feed shelf having a outer edge positioned to extend above the base of the trough;

the upper edge of the trough being positioned laterally outwardly in relation to the outer edge of the shelf so as to be arranged to capture feed falling from the feed shelf;

a space between the upper edge of the trough and the outer edge of the feed shelf being arranged for accommodating access to a head of one of the animals;

a feed hopper above the feed shelf and arranged for containing the particulate feed;

at least one discharge chute extending downward from the hopper to a lower edge of the discharge chute and being arranged for communicating the particulate feed therethrough to the feed shelf;

said at least one discharge chute being arranged to be supported in proximity to the feed shelf such that an angle of repose of the particulate feed from the lower edge of discharge chute to the feed shelf prevents the particulate feed from falling from the feed shelf;

a water supply arranged for supplying water to the trough; and a level control arranged to control the water supply to maintain water level in relation to the trough at a set point level;

the level control being arranged to maintain the water level through a range of set point levels including a level which is below a lowermost point in elevation of the trough.

By delivering water to the feed trough at a set point level accurate control over the amount of water being provided to the hogs can be achieved by adjusting the set point level to any desired amount. By better controlling the amount of water in the feeder, more optimum feed conditions can be provided to the pig to ensure that the pigs are not drinking access water and to ensure that the minimum amount of feed is spoiled by too much water. In addition waste water from overflowing is also prevented.

Preferably the level control comprises a mechanical control. For example, the level control may comprise:

an upright pipe having a bottom end in communication with the trough;

a vacuum valve having an inlet in communication with the water supply and an outlet in communication with a top end of the pipe; and a pressure responsive member arranged to open the valve when the bottom end of the pipe is above the water level and arranged to close the valve when the bottom end is at or below the water level in the trough.

The level control is preferably arranged to maintain the water level through a range of set point levels including a level which is below a lowermost point in elevation of the trough.

There may be provided a reservoir area supported externally from the trough and in communication with the trough through which the water supply communicates. Preferably the water reservoir communicates with a lowermost point in elevation of the trough.

When the trough includes two portions each extending in the longitudinal direction adjacent one another, preferably each communicates independently with the reservoir area. Each of the trough portions may have a generally concave upper surface communicating with the reservoir area at a lowermost point in elevation thereof.

Preferably the trough includes at least one generally concave upper surface portion.

In illustrated embodiments, there is provided a plurality of discharge chutes at longitudinally spaced positions along the shelf.

According to another aspect of the present invention there is provided a feeder device for feeding particulate feed to animals, the device comprising:

a trough having a base and laterally opposed side edges spaced upwardly from the base and extending in a longitudinal direction between opposing ends;

a feed shelf having side edges and being positioned to extend in the longitudinal direction spaced above the base of the trough;

the side edges of the trough being positioned laterally outwardly in relation to the side edges of the shelf so as to be arranged to capture feed falling from the feed shelf;

a space between the side edges of the trough and the side edges of the feed shelf being arranged for accommodating access to a head of one of the animals;

a feed hopper above the feed shelf and arranged for containing the particulate feed;

a plurality of discharge chutes, each extending downward from the hopper to a lower edge of the discharge chute and arranged for communicating the particulate feed therethrough to the feed shelf;

the plurality of discharge chutes being arranged to be supported in proximity to the feed shelf such that an angle of repose of the particulate feed from the lower edge of each discharge chute to the feed shelf prevents the particulate feed from falling from the feed shelf; and a water supply arranged for supplying water to the trough.

By further providing a feed shelf with separate feed stations having their own discharge chute where the pigs can control agitation of the feed, there is less competition for food and less concern for plugging of the feed from the hopper to the feed shelf so that the feed mixture can be delivered in chop form even when milk content is provided in the feed mixture.

The chutes are preferably all moveable together in elevation relative to the shelf to adjust spacing between the lower edge of the chutes and the shelf through actuation of a single lever.

Each chute may be suspended by a shaft extending downwardly therethrough, the shafts being rotatably supported on a common support member for rotation with the respective chutes relative to the trough.

Each chute may further include a diametrically extending crossbar adjacent a bottom end thereof which connects the shaft to the chute.

When each chute comprises a tubular member rotatably supported about a discharge pipe in communication with the hopper wherein a bottom end of the tubular member is spaced below a bottom end of the discharge pipe, preferably an interior dimension of the tubular member is greater than an upper dimension of the discharge pipe so as to be arranged for relative rocking movement between the tubular member and the pipe surrounded by the tubular member to agitate feed therein.

There may be provided a divider member spanning laterally between opposing sides of the trough between each of the plurality of discharge chutes. Preferably the divider members are suitably spaced so as to be arranged to allow no more than two piglets between any two adjacent divider members and so as to allow no more than one full grown hog between any two adjacent divider members. Each divider member is preferably fixedly secured to each of the laterally opposed side edges of the trough and to the feed hopper thereabove.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
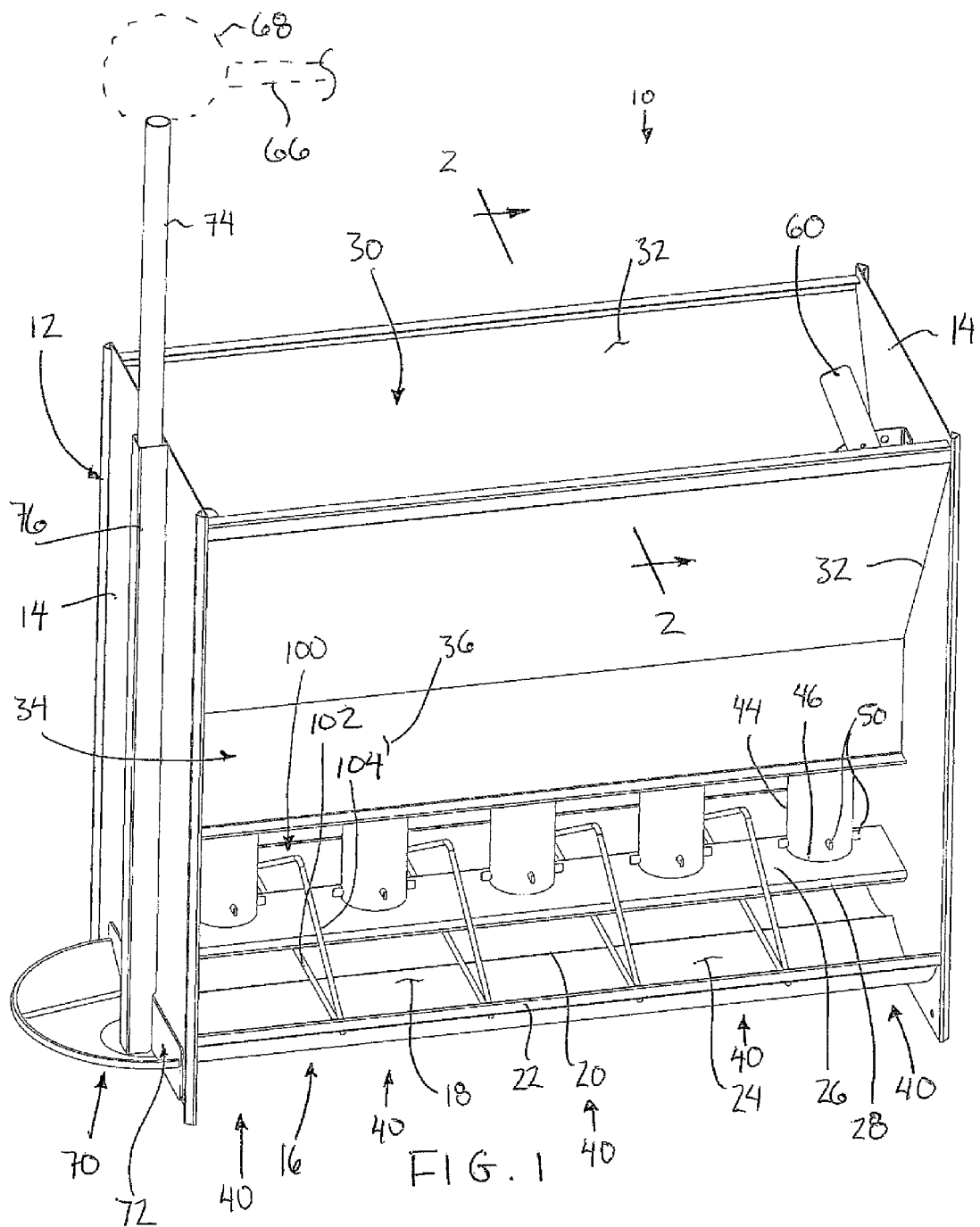
FIG. 1 is a perspective view of a first embodiment of the feeder device.
Figure 2:
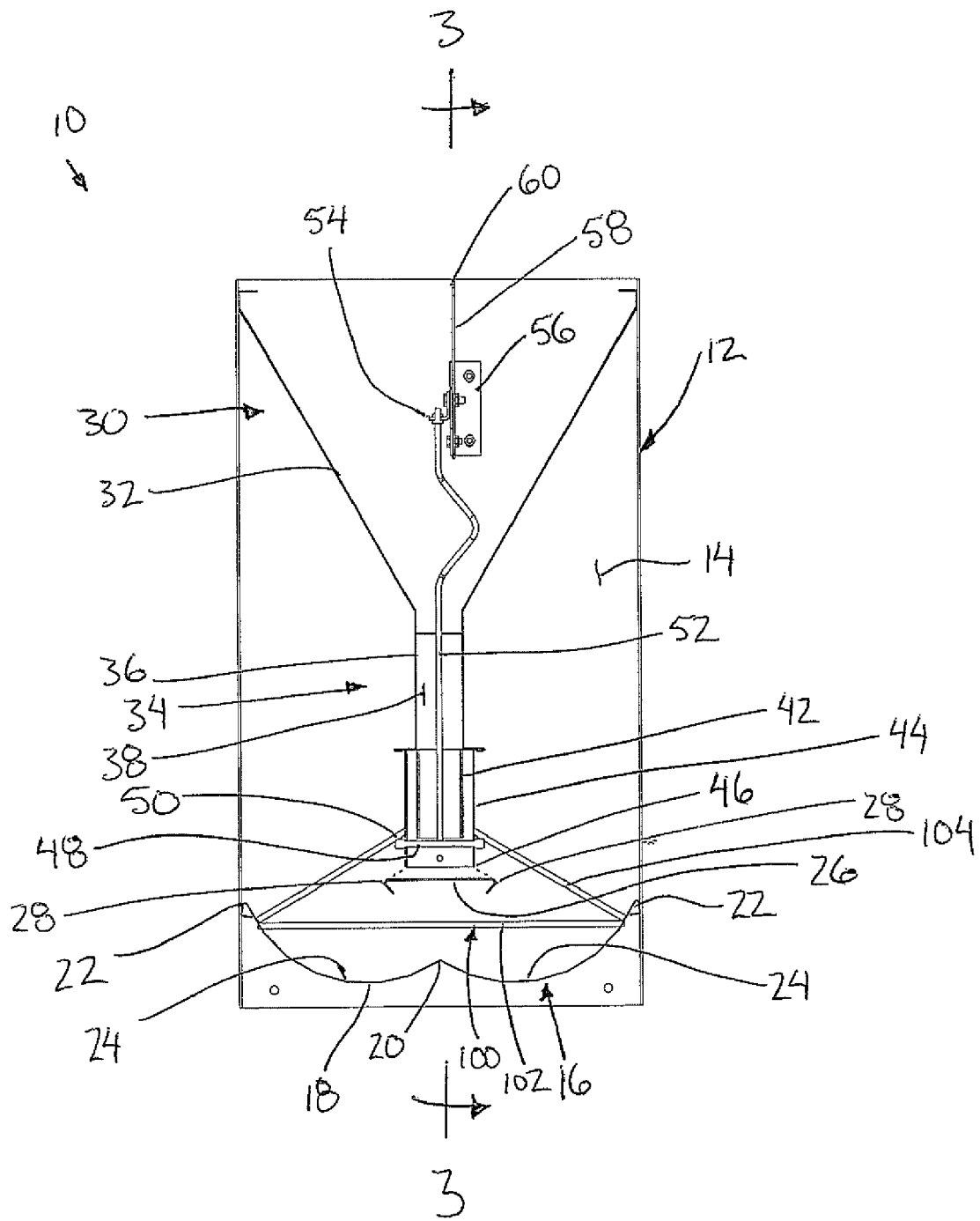
FIG. 2 is a sectional elevational view along the line 2-2 of the feeder device of FIG. 1.
Figure 3:
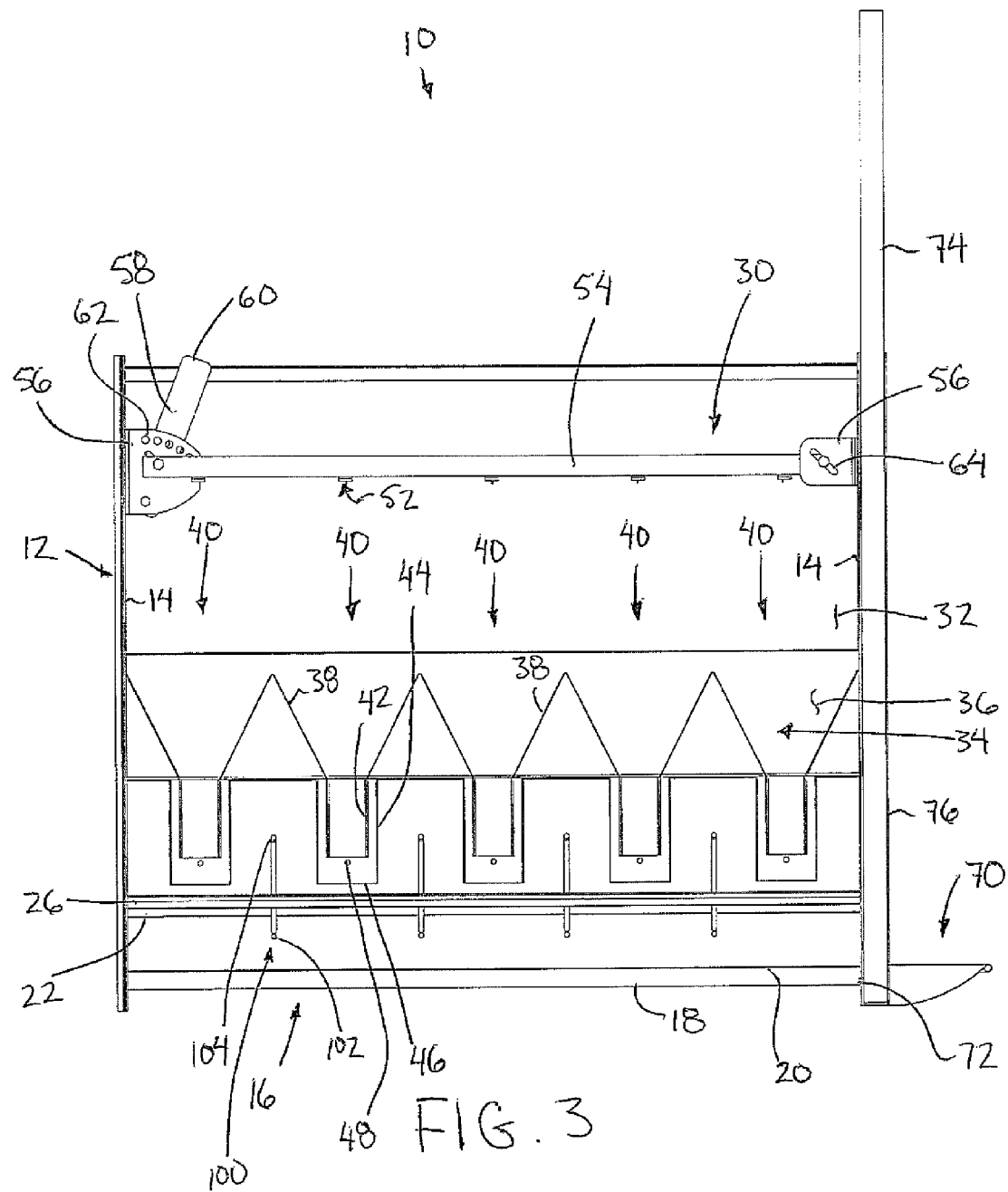
FIG. 3 is a sectional elevational view of the feeder device along the line 3-3 of FIG. 2.
Figure 4:
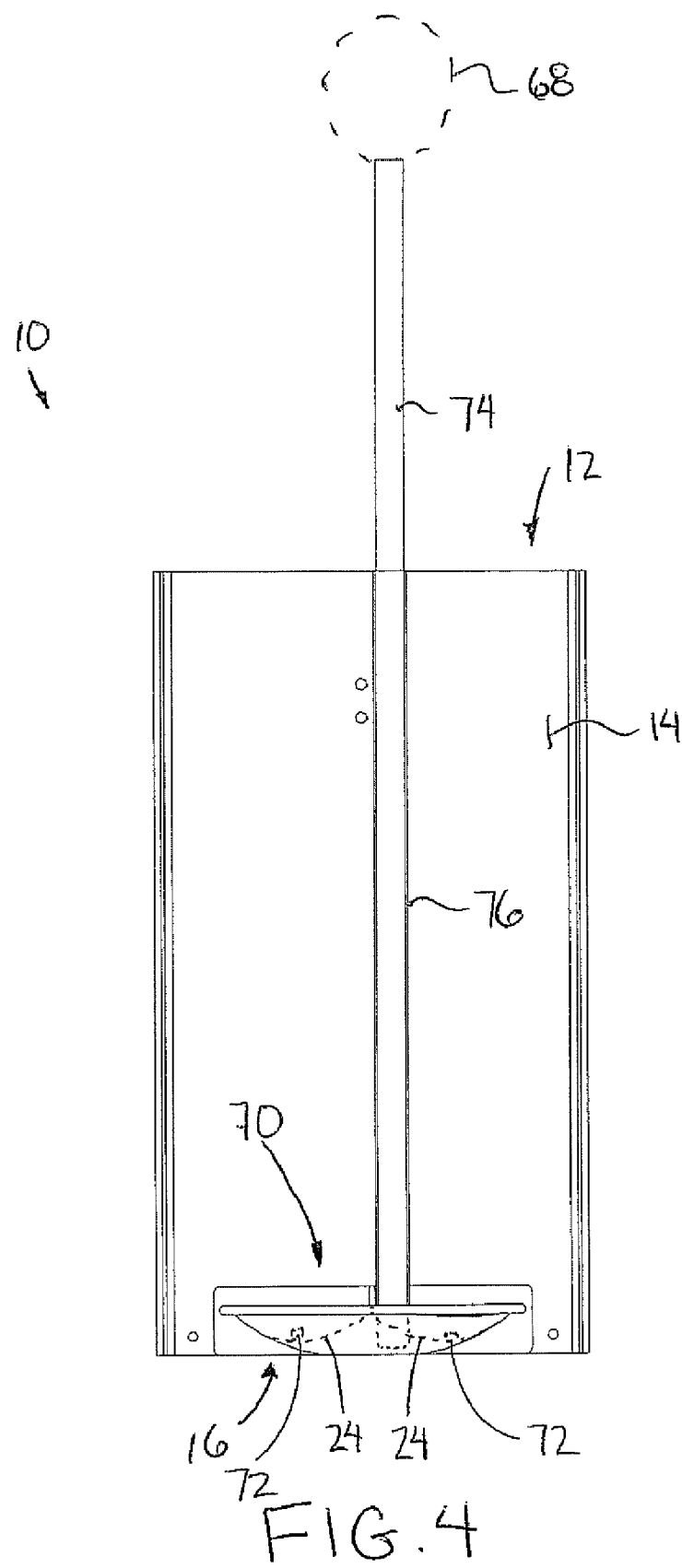
FIG. 4 is an end elevational view of the feeder device of FIG. 1.
Figure 5:
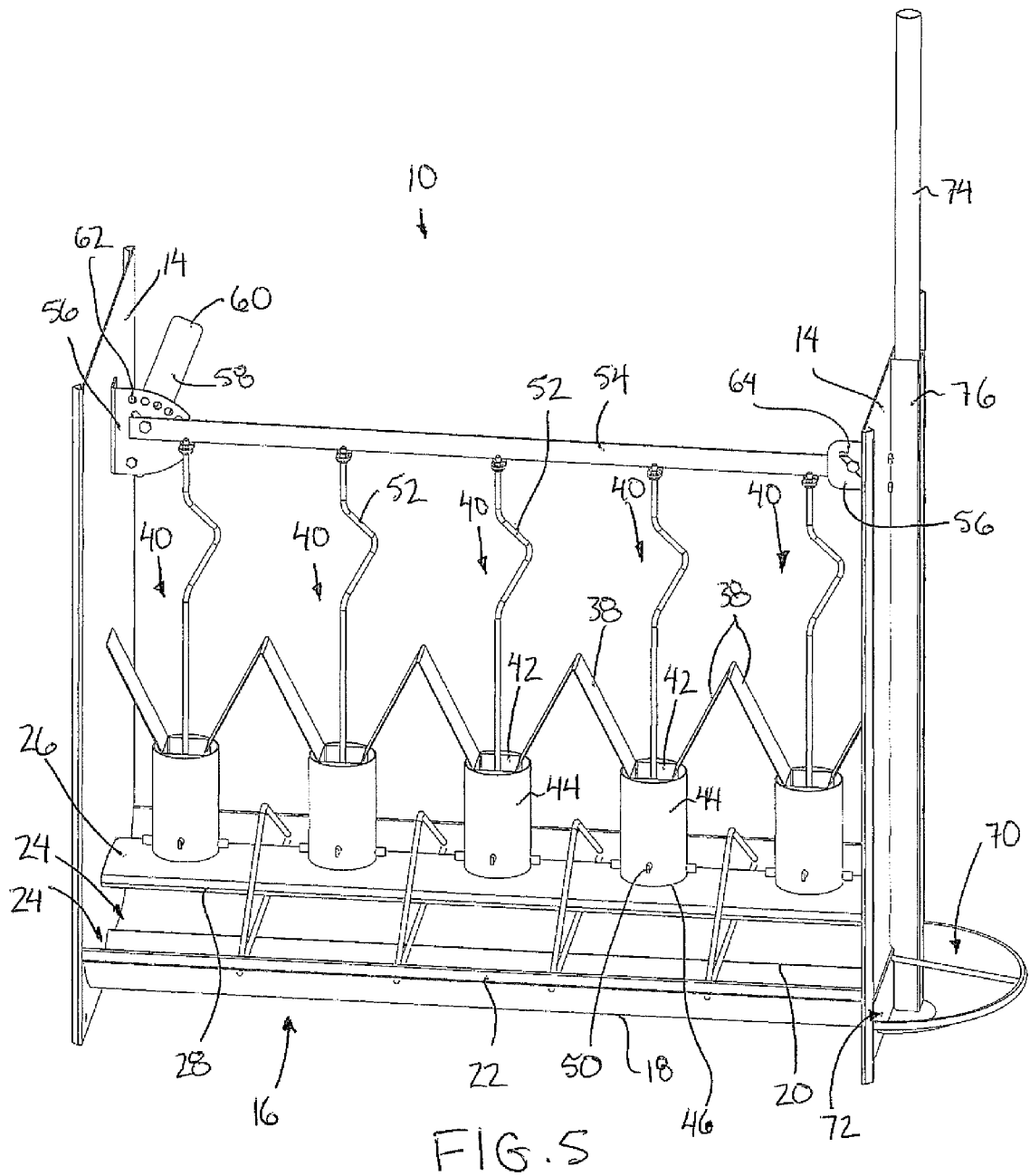
FIG. 5 is a perspective view of the feeder device according to the first embodiment with the hopper walls being shown removed from the housing.

Referring to the accompanying figures there is illustrated an animal feeder device generally indicated by reference numeral 10. The device 10 is particularly suited for feeding hogs, starting as piglets and continuing on into adulthood. The device is well suited for feeding a feed mixture to the hogs in the form of either chop or crumblings, with or without water because the water level can be accurately controlled. Though various embodiments are disclosed in the accompanying figures and the following description, the common features of each will first be described herein.

The device 10 generally comprises a housing 12 having two opposed upright end walls 14 which are spaced apart in the longitudinal direction of the housing. Each end wall 14 is an upright rectangular panel lying generally parallel to the opposing end wall.

A trough 16 extends between the bottom ends of the two end walls 14 so that the trough is generally elongate in the longitudinal direction. The trough includes a base 18 having a central longitudinally extending ridge 20 which is centered in a lateral direction between opposing outer edges 22 of the trough 16. The trough defines two concave portions 24 having a concave upper feeding surface which meet at the central ridge 20 to extend downwardly and outwardly to a lowest portion of the trough portion in elevation before further extending laterally outwardly and upwardly to the respective upper edge or outer side edge 22 of the trough, thereby defining two laterally spaced apart side walls which extend in the longitudinal direction and extend upwardly from the base 18 to the outer edges 22 of the through.

A feed shelf 26 is supported above the trough to extend in the longitudinal direction of the housing between the end walls 14 upon which it is also supported at opposing ends similarly to the trough. The feed shelf 26 is much narrower between opposing side or outer edges 28 than the trough and is positioned laterally centered, spaced above the trough 16, with the side edges extending in the longitudinal direction, laterally spaced from one another. Due to the narrower dimensions of the shelf 26, each outer or upper side edge 22 of the trough is arranged to be positioned spaced downwardly and outwardly in relation to the respective side or outer edge 28 of the shelf sufficiently that any feed falling from the shelf 26 is caught in the trough while also providing a sufficient space therebetween to allow access by the head of the animal for feeding from the trough. Though the feed shelf is spaced slightly above the outer edge 22 of the trough, the shelf remains near in elevation to the trough top outer edges 22. The central ridge 20 of the trough below the shelf is much lower in elevation than the outer edges 22 of the trough to provide a large clearance space between the shelf and the ridge.

A hopper 30 is supported above the feed shelf for containing the feed mixture therein and for delivering the feed mixture down to the shelf. The hopper 30 includes two opposed tapered walls 32 extending in the longitudinal direction of the housing to extend downwardly and inwardly from opposing top side edges of the housing in abutment with the end walls 14 which define the ends of the hopper compartment 30. The tapered walls 32 taper downwardly and inwardly towards each other along a fully length of the housing to a bottom end where the tapered walls 32 remain spaced apart by a spacing which is narrower than the shelf therebelow. The tapered walls 32 are spaced apart by the full width of the housing at the top end thereof.

The hopper 30 includes a manifold section 34 below the tapered walls where the tapered walls 32 transition to upright walls 36 which are generally vertical in orientation so as to be parallel and spaced apart by the narrowest spacing of the tapered walls 32 thereabove. The upright walls 36 also span the length of the housing in the longitudinal direction.

A series of baffles 38 in the manifold section 34 separate the feed into five separate feed stations 40 aligned sequentially with one another in the longitudinal direction. Each feed station 40 is defined by two of the baffles 38 which span perpendicularly to the upright walls 36 to span between the walls. The two baffles defining each feed station are spaced apart by the full width of the feed station in the longitudinal direction at a top end while tapering downwardly and inwardly towards one another to be spaced apart at a bottom end by a spacing which corresponds approximately to the spacing between the upright walls 36 of the manifold section so that a generally square discharge opening is defined at the bottom end of each station 40. Each baffle 38 is joined at its top end with the baffle of the adjacent feed section with the exception of the two baffles at opposing ends of the housing which are instead joined with the end walls 14 of the housing.

Each feed station is further provided with a discharge pipe 42 which extends downwardly from the manifold section 34 having a square cross section in alignment with the square aperture formed by the baffles in the manifold section of the respective feed station 40. The baffles 38 thus serve to direct the feed within each station into the respective discharge pipe 42 which extends downwardly from the manifold section towards the shelf centered between the opposing side edges 28 of the shelf. The bottom end of the discharge pipe 42 is spaced above the shelf sufficiently that the space between the discharge pipe and the shelf does not impede the flow of the feed mixture from the pipe into the trough.

The feed of flow is instead controlled by a discharge chute 44 supported on the discharge pipe 42 at each feed station 40. Each discharge chute comprises a tubular collar which is round in cross section and which is supported about the discharge pipe 42 of square cross section to overlap a full length of the pipe and extend downwardly therebeyond. An inner diameter of the collar is arranged to be slightly less than the largest diagonal dimension of the discharge pipe 42 so that the collar fits loosely about the pipe to allow some relative rocking motion of the collar upon the pipe. The diameter of the collar forming the discharge chute 44 remains less than the lateral width of the shelf so that positioning the chute close to the shelf causes the shelf to retain feed mixture on the shelf.

Each discharge chute 44 is supported for sliding movement in an upright direction along the respective discharge pipe about which it is mounted so that the space between the bottom edge 46 and the top surface of the shelf can be adjusted from a range in which the chute abuts the shelf and there is no space therebetween to a considerable gap between the chute and the shelf where feed flow is substantially unrestricted therebetween. In typical use the lower bottom edge 46 of the chute is positioned relative to the shelf in sufficiently close proximity that an angle of repose of the feed from the lower edge of the chute extending downwardly and outwardly to the shelf prevents the feed from reaching the edge of the shelf and thus falling from the shelf and continuing to flow from the chute. Thus as the particulate feed flows from the chute it forms an angle of repose from the lower edge of discharge chute to the feed shelf prevents the particulate feed from reaching the edge of the feed shelf thus preventing the feed from falling from the feed shelf and preventing flow of further feed from the chute.

Each chute 44 includes two crossbars 48 extending diametrically across the interior of the chute perpendicular to one another adjacent the bottom end thereof. The crossbars project outwardly beyond the outer diameter of the collar forming the chute to define outer projections 50 at circumferentially spaced positions at 90 degree intervals about the exterior of the collar for suitable engagement by the snout of the hogs to rotate the chutes about the pipes as desired. The crossbars 48 serve to mix and agitate the feed mixture at the outlet of the chute so that the hogs can encourage dispensing of the feed mixture from the chute as desired.

A central mixing bar 52 is provided in association with each chute 44 in the form of a shaft which extends through the center of the discharge pipe 44 from a bottom end connected centrally on one of the crossbars 48 to a top end which is rotatably supported on a chute support member 54 of the housing. Each mixing bar 52 is arranged to be rotatable with the respective chute 44 suspended therefrom at its bottom end relative to the housing.

The support member 54 extends in the longitudinal direction of the housing generally between the two end walls 14 in an upper portion of the hopper 30. The mixing bars 52 are supported at longitudinally spaced positions thereon for free rotation relative to the support member. The support member is carried on the end walls by a pair of end brackets 56 which support the support member 54 through a linkage for movement commonly at both ends between raised and lowered positions which correspond to raising and lowering of the chutes relative to the shelf.

The linkage comprises a lever 58 pivotally coupled at an inner end on one of the brackets 56 and pivotally supporting thereon the respective end of the support member 54 thereon at a location centrally spaced between the inner end pivotal on the bracket and an outer free end 60 of the lever. Pivotally displacing the lever about its axis relative to the bracket 56 upon which it is mounted causes the end of the support member pivotally coupled thereto to be displaced through a small arc in the range of movement of the lever which extends upward at an incline extending longitudinally outward relative to the housing.

The bracket 56 supporting the lever thereon also includes a plurality of locking apertures 62 at circumferentially spaced positions in an arc about the pivot of the lever in alignment with the range of movement of the lever for cooperation with a locking pin on the lever which permits the lever to be fixed at any one of numerous positioned pivoted relative to the bracket. In each of the different positions of the lever that end of the support member supported on the lever is supported at a different height relative to the housing which in turn supports the chutes at a different height relative to the shelf.

The other end of the support member 54 opposite the lever 58 is supported on its respective bracket by a pin received through a corresponding slot 64 in the bracket. The slot 64 is parallel to and matches the upward and longitudinally inclined orientation of the range of movement of the pivot connection of the support member on the lever so that as the support member is displaced with the lever at one end, the other end of the support member follows a similar path along the slot 64. Accordingly both ends of the support member are simultaneously displaced upward at an outward incline through pivoting movement of the single lever. Both ends of the support member and all chutes suspended therefrom are accordingly commonly displaced upwardly and downwardly relative to the housing with displacement of a single lever between its various positions corresponding to the apertures 62 in the bracket 56 which in turn correspond to the range of heights between the chutes 44 and the shelf.

Water is delivered to the trough through a water supply line 66 which communicates through a vacuum water valve 68 to deliver a controlled level of water in a reservoir area 70 of the housing. The reservoir area 70 is separate from the remaining portion of the trough and can be located in various positions relative to the trough as defined below in the various embodiments described and illustrated herein. In each instance the reservoir area 70 is arranged to be lower in elevation than the lowest part of the trough with the reservoir area being in communication with the trough through an aperture in a vertical divider wall between the trough and the reservoir area. The aperture 72 communicating between the trough and the reservoir area communicates with the lowest point of the trough in elevation. The trough is installed to be horizontal between the opposed ends thereof by level all four corners of the housing relative to the ground to ensure proper flow of water between the reservoir area and the trough.

The vacuum water valve 68 includes an inlet coupled to the supply line 66 and an outlet which communicates with a water pipe 74 which extends vertically from a bottom end in communication with the reservoir area 70 to a top end spaced above the housing. A channel member 76 extends vertically along the outer side of one of the end walls of the housing to slidably receive the water pipe 74 therein.

The vacuum water valve 68 is of a type which is arranged so that the valve is open and water is continued to be dispensed from the water supply line 68 into the water pipe 74 provided that the bottom end of the water pipe is above the level of water in the reservoir area so that air is permitted to enter from the surroundings up through the bottom end of the pipe 74. When the water level rises to meet the bottom end of the pipe or the elevation of the pipe is changed so that the open bottom end of the pipe 74 contacts the surface of the water and air is no longer permitted to readily be drawn into the bottom end of the pipe, the vacuum water valve 68 is arranged to close to prevent further dispensing of water.

The water level in the water reservoir area 70 and accordingly the trough in communication therewith through the aperture 72 is thus a set point level which can be set at any one of various elevations from a level which is below elevation of the trough so that no water enters the trough to a level spaced above the trough where water level in the trough is filled up to the set point level. The vacuum water valve 68 comprises a conventional water valve as manufactured by Rotecna of Spain and as described in U.S. Pat. No. 6,843,206, to Knippelmeir, the disclosure of which is hereby incorporated herein by reference.

The design of the vacuum water valve is advantageous as it is a purely mechanical valve relying on a diaphragm operating between and responsive to pressure in two pressure chambers so that no electrical parts are required for safe and reliable operation in a hog barn. The water level can be readily set by simply adjusting the height of the pipe 74 within the surrounding channels 76 by a set screw or other suitable means so that the bottom end of the water pipe 74 is positioned either at the bottom of the reservoir area 70 below the lowest point in elevation of the trough if no water is desired in the trough, or at an elevation which is higher and spaced above the lowest point of the trough at which point the rising water level from opening of the valve will cause the corresponding water level in the trough to rise through communication through the aperture 72.

Divider bars are located between each adjacent pair of feed stations 40. The divider bars 100 are each centered between two adjacent chutes 44 and extend generally in a vertical plane in the lateral direction between opposing sides of the trough. Each dividing bar includes a lower bar 102 extending horizontally partway between the shelf and the base of the trough to be supported at opposing ends on the opposing side walls of the trough. An upper bar 104 extends upwardly and inwardly from both ends of each lower bar to meet at a central apex spaced above the shelf in between two adjacent chutes 44. The divider bars extends in proximity to the side edge of the shelf, in proximity to the ridge 20 of the trough and in proximity to the collars forming the chutes at a spacing typically less than three inches for example, so as to be suitably sized to prevent access of the head of a piglet therebetween so as to minimize the opportunity for a piglet's head to become caught between the components of the feeder device. Spacing between adjacent divider bars 100 defines the width of each feeding station 40 in which the width of the feeding station is selected to accommodate no more than two piglets or no more than one hog which is fully grown so as to minimize competition between hogs for food.

Turning now to the first embodiment, the reservoir area 70 in this instance comprises a water bowl supported externally from the housing on one of the end walls which supports the channel 76 and water pipe 74 thereon. Accordingly the bottom end of the water pipe 74 communicates directly with the volume defined within the water bowl supported externally on the end wall of the housing. The water bowl is generally semi-circular about its upper edge and tapers downwardly and inwardly towards the bottom which is at the center of the bowl directly against the end wall. Apertures communicate through the end wall 14 from the bottom of each concave portion of the trough at a position which is spaced above the bottom end of the water bowl as the water bowl extends downwardly below the lowest elevation of the trough. The bottom end of the water pipe 74 is in alignment with the portion of the water bowl extending lower in elevation than the through to permit setting of the water level below the trough for a dry trough mode of operation. The water bowl includes an open top end having sufficient clearance for the head of an animal to be received therein for drinking directly from the water bowl as desired.

Figure 6:
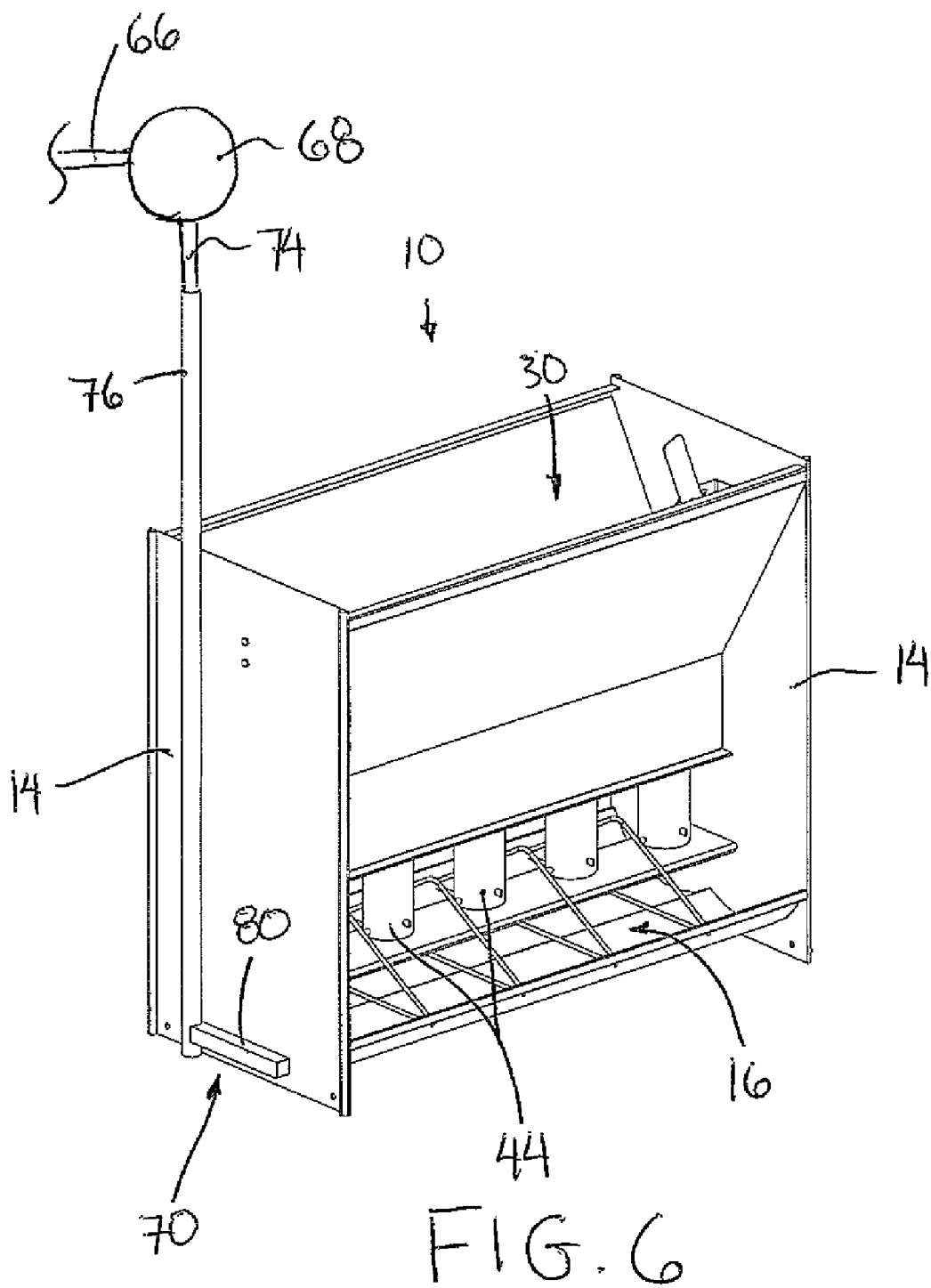
FIGS. 6 and 7 are perspective views from opposing ends of a second embodiment of the feeder device.
Figure 7:
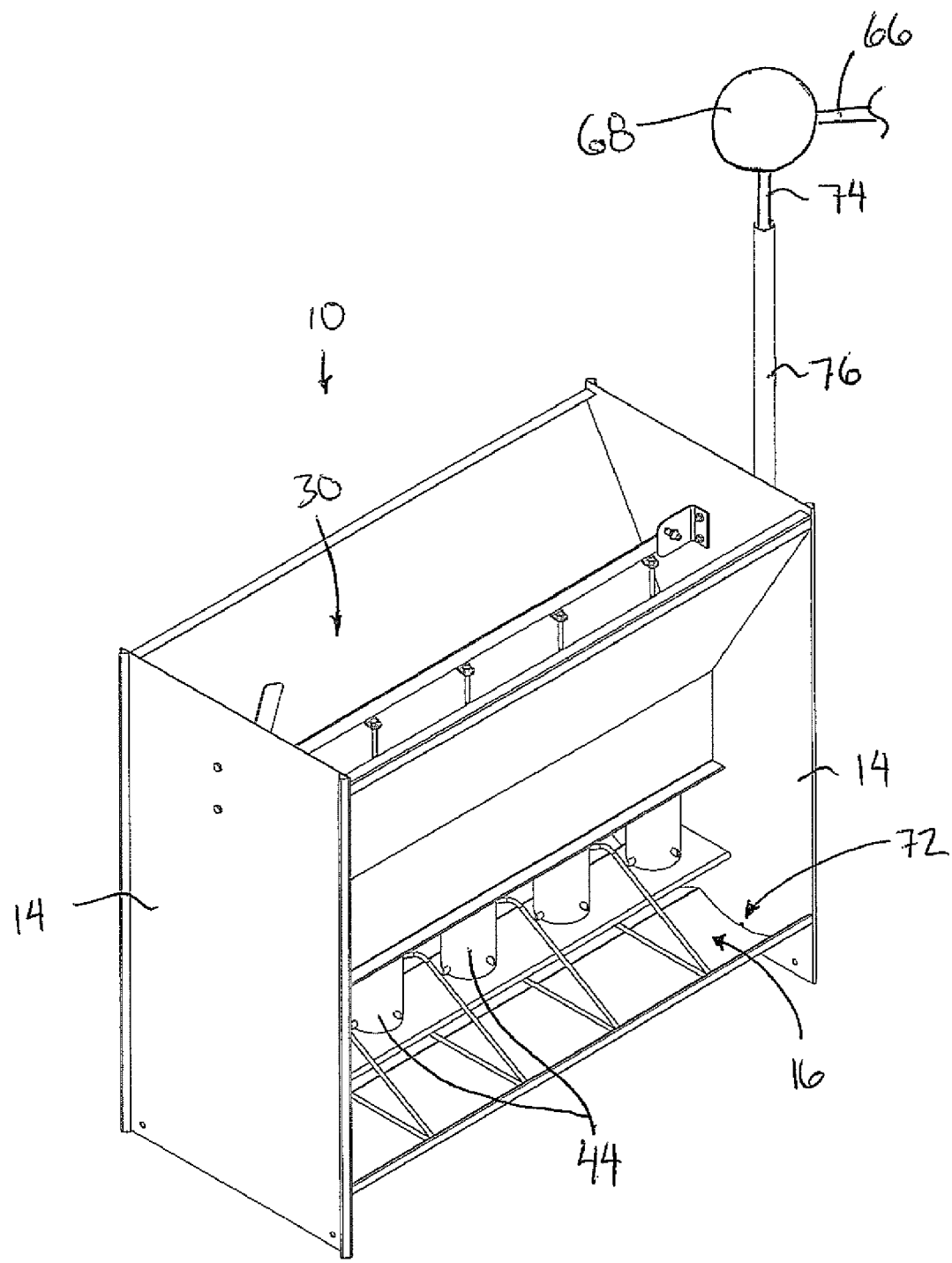

Turning now to the embodiment of FIGS. 6 and 7, the reservoir area 70 may instead comprise an enclosed tubular chamber spanning generally horizontally along one of the end walls in communication between the apertures 70 in communication through the end wall with the lowest point of each of the concave portions of the trough. The channel 76 surrounding the pipe in this instance is enclosed at its bottom end at a location lower in elevation than the tubular chamber 80 with the channel communicating with the tubular chamber to together form the reservoir area 70 communicating between the bottom end of the water pipe 74 and the trough. By extending the enclosed bottom end of the channel 76 below the tubular chamber and below elevation of the lowest point of the trough, the bottom end of the water pipe 74 can be set at a level which is below the troughs to effectively prevent the water level from rising to reach the trough.

Figure 8:
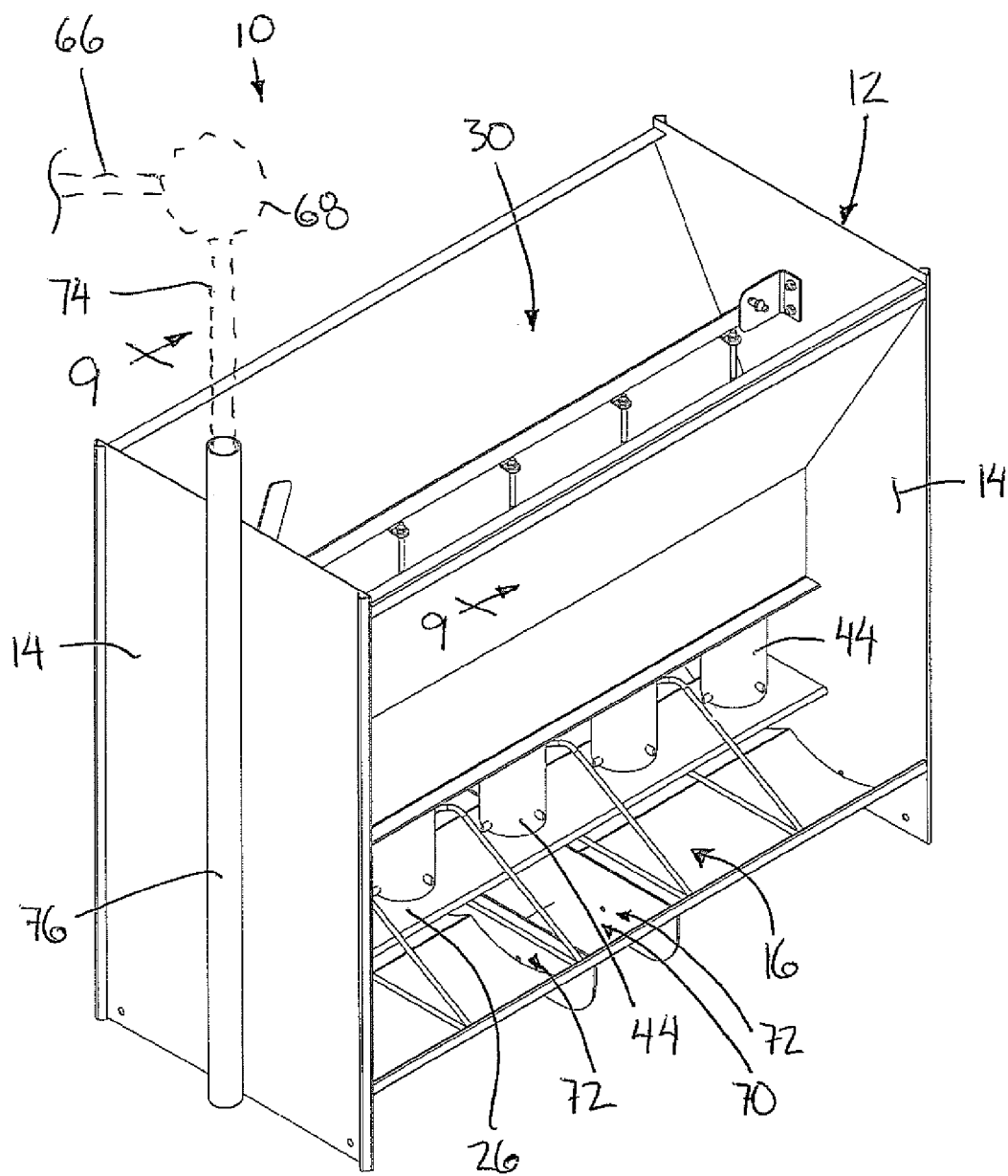
FIG. 8 is a perspective view of a further embodiment of the feeder device.
Figure 9:
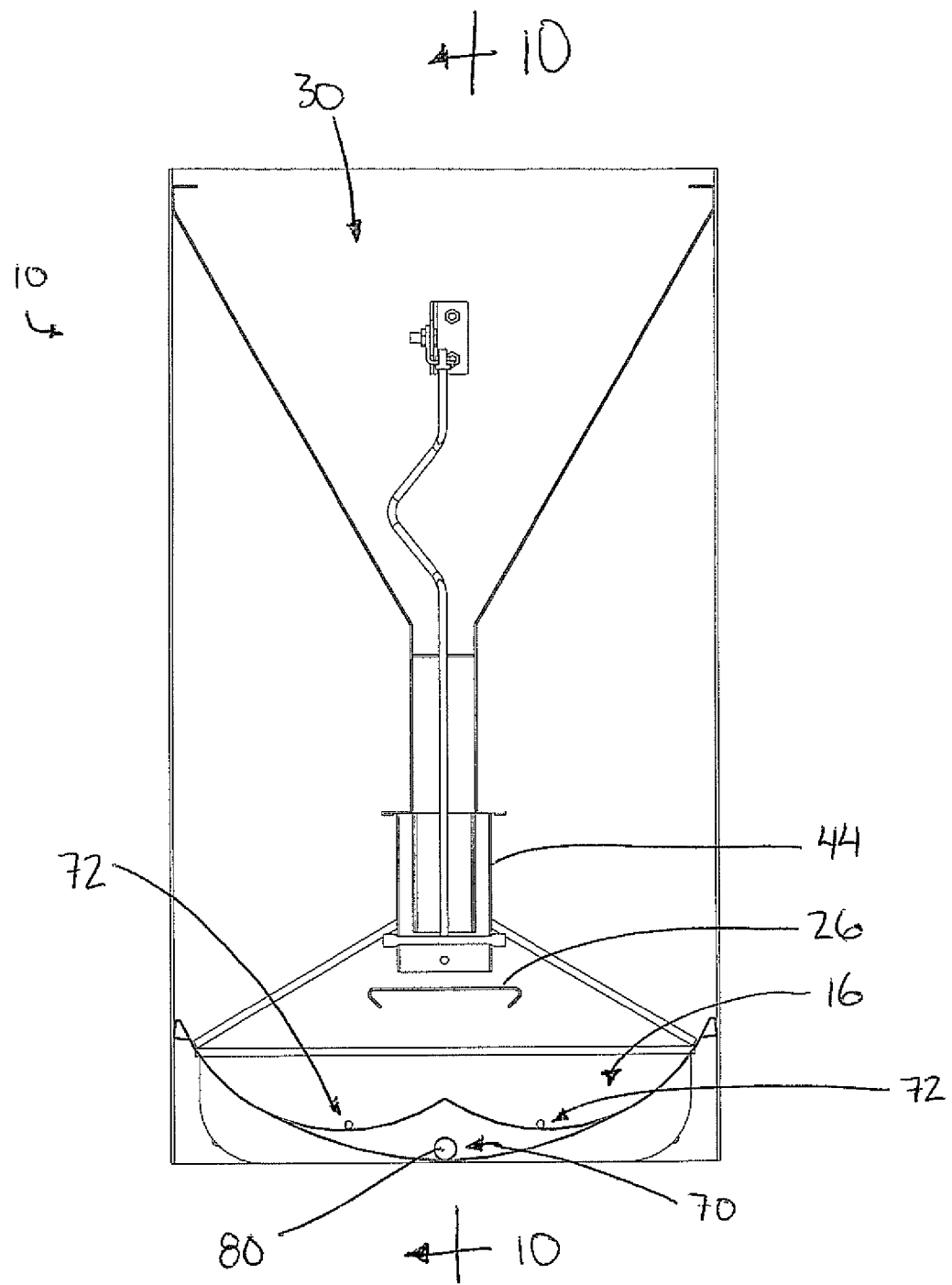
FIG. 9 is a sectional view along the line 9-9 of FIG. 8.
Figure 10:
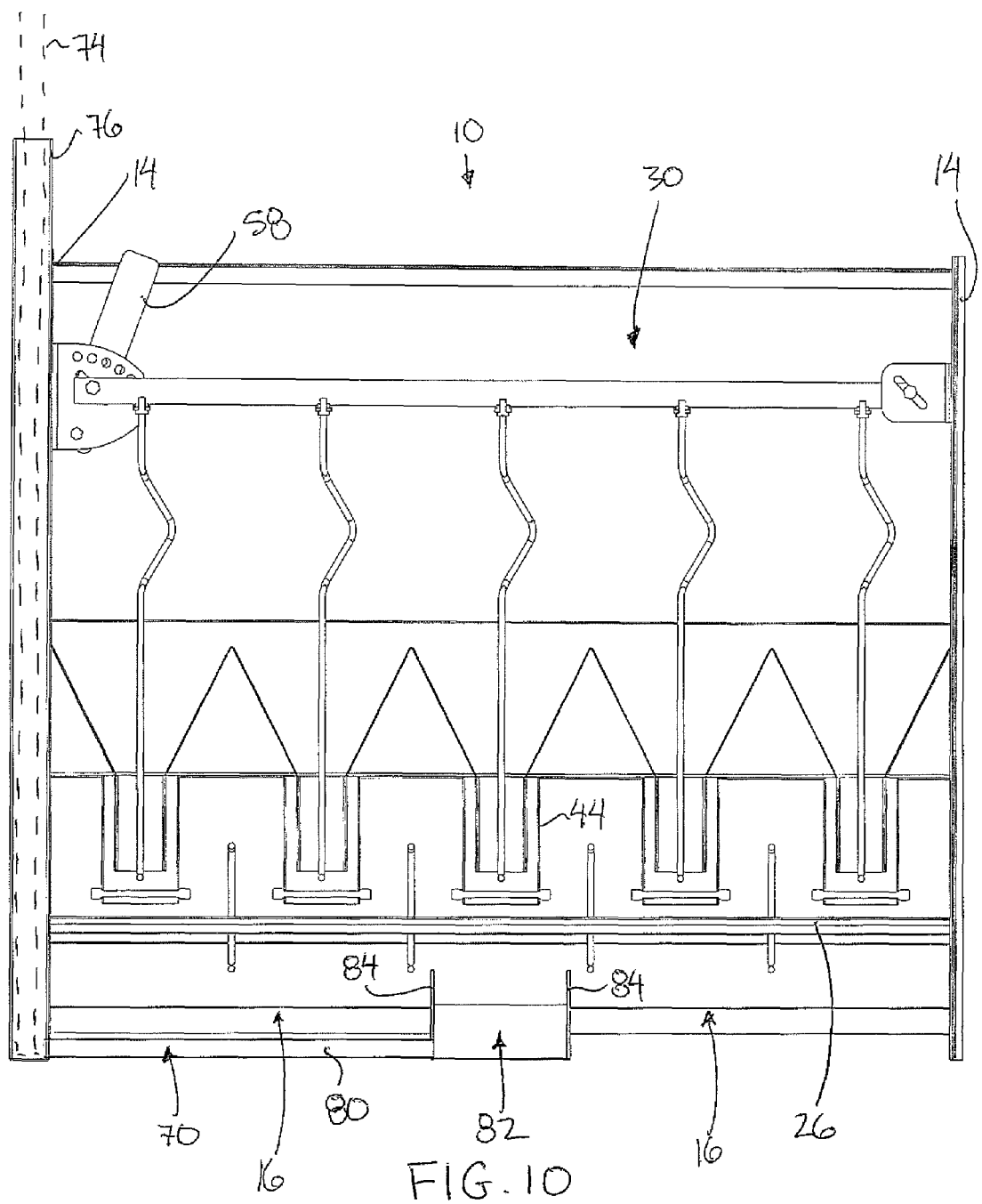
FIG. 10 is a sectional view along the line 10-10 of FIG. 9.

Turning now to the embodiments of FIG. 8 through 10, the reservoir may again comprise a combination of a tubular chamber 80 and the channel member 76 in communication therewith when the channel has an enclosed bottom end, however in this instance the tubular chamber 80 extends in the longitudinal direction from the channel 76 at one of the end walls, below the trough in the longitudinal direction, to an opposing end of the tubular chamber 80 which is in communication with a central portion 82 of the trough. A pair of vertical dividers 84 are provided on each side of the central portion of the trough to span in a lateral direction between the opposing sides of the trough and divide the trough into two opposing end portions. An aperture communicates from the lowest point of the central portion 82 through to the tubular chamber 80 below the trough so that setting the water level in the channel member 76 again effectively sets the water level in the trough as water communicates from the channel member 76 to the tubular chamber 80 and then to the central potion 82 of the trough before communicating through the apertures 72 in the dividers 84 at the lowest point of communication with the concave portions of the through respectively.

Figure 11:
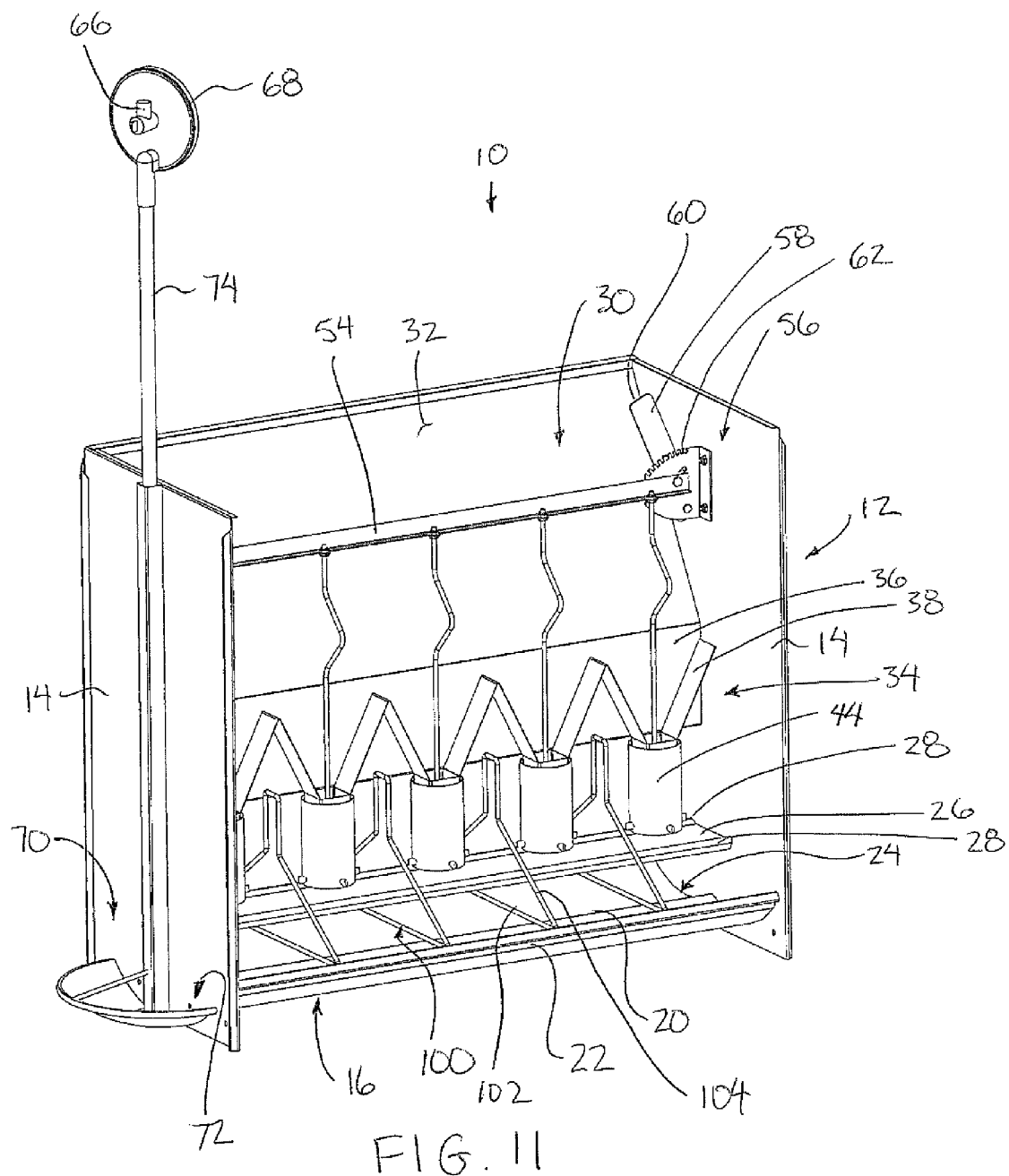
FIG. 11 is a perspective view of a further embodiment of the feeder device in which one of the hopper walls is shown removed from the housing.

Turning now to FIG. 11, a further embodiment of the animal feeder device 10 is illustrated which is substantially identical to the embodiment of FIG. 1 noted above with the exception of the configuration of the height adjustment linkage of the support member 54 and the configuration of the divider bars 100. With regard to the linkage for height adjustment of the support member 54, a similar bracket 56 is provided for supporting a lever 58 thereon. The bracket differs in that the locking apertures 62 are provided along a peripheral edge of the plate forming the bracket 56 such that each aperture 62 forms a slot in the peripheral edge which receives a similar locking pin of the lever therein at any one numerous pivoted positions relative to the bracket. Similar to the embodiment of FIG. 1, in each of the different positions of the lever, the end of the support member 54 supported on the lever is effectively supported at a different height relative to the housing and at a different position in the longitudinal direction. The slot 64 in the opposing bracket thus serves to guide the opposing end of the support member 54 to similarly vary in height relative to the housing to adjust the heights of all of the chutes simultaneously.

With regard to the divider bars 100, the bars again comprise a lower bar 102 which is fixedly secured to span between the two laterally opposed side edges of the trough. Two upper bars 104 are again also provided to extend upwardly and inwardly from opposing ends of the lower bar 102 anchored on the laterally opposed side edges of the trough so as to be joined with one another at a central location between the two side edges of the trough spaced above the feed shelf. The upper bars 104 of the embodiment of FIG. 11 differ from the previous embodiment in that the upper bars are joined with one another at respective vertically extending portions which are fixedly secured to one another between the upright walls 36 of the manifold section at the base of the feed hopper located above the trough. Each of the divider bars is accordingly anchored fixedly to the housing at three connection points arranged in a triangular pattern within a vertical plane oriented perpendicularly to the longitudinal direction of the housing between two discharge chutes.

Although the illustrated embodiments are directed towards an elongate feed shelf and trough therebelow having two parallel sides, in further embodiments, the feed shelf may be circular or semi-circular in shape with the trough having a similar contour so that an upper side edge of the trough is positioned downwardly and outwardly in relation to the outer side edge of the feed shelf as in the embodiments noted above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A feeder device for feeding particulate feed to animals, the device comprising:
   a trough having a base and laterally opposed side edges spaced upwardly from the base and extending in a longitudinal direction between opposing ends;
   a feed shelf having side edges and being positioned to extend in the longitudinal direction spaced above the base of the trough;

the side edges of the trough being positioned laterally outwardly in relation to the side edges of the shelf so as to be arranged to capture feed falling from the feed shelf;

a space between the side edges of the trough and the side edges of the feed shelf being arranged for accommodating access to a head of one of the animals;

a feed hopper above the feed shelf and arranged for containing the particulate feed;

at least one discharge chute extending downward from the hopper to a lower edge of the discharge chute and arranged for communicating the particulate feed therethrough to the feed shelf;

said at least one discharge chute being arranged to be supported in proximity to the feed shelf such that an angle of repose of the particulate feed from the lower edge of discharge chute to the feed shelf prevents the particulate feed from falling from the feed shelf;

a water supply arranged for supplying water to the trough;

a level control arranged to control the water supply to maintain water level in relation to the trough at a set point level.

2. The device according to claim 1 wherein the set point level is adjustable.

3. The device according to claim 1 wherein the level control comprises a mechanical control.

4. The device according to claim 1 wherein the level control comprises:

an upright pipe having a bottom end in communication with the trough;

a vacuum valve having an inlet in communication with the water supply and an outlet in communication with a top end of the pipe; and a pressure responsive member arranged to open the valve when the bottom end of the pipe is above the water level and arranged to close the valve when the bottom end is at or below the water level in the trough.

5. The device according to claim 1 wherein the level control is arranged to maintain the water level through a range of set point levels including a level which is below a lowermost point in elevation of the trough.

6. The device according to claim 1 wherein there is provided a reservoir area supported externally from the trough and in communication with the trough through which the water supply communicates.

7. The device according to claim 6 wherein the water reservoir communicates with a lowermost point in elevation of the trough.

8. The device according to claim 6 wherein the trough includes two portions each extending in the longitudinal direction adjacent one another and each communicating independently with the reservoir area.

9. The device according to claim 8 wherein each of the trough portions have a generally concave upper surface communicating with the reservoir area at a lowermost point in elevation thereof.

10. The device according to claim 1 wherein the trough includes a generally concave upper surface portion.

11. The device according to claim 1 wherein said at least one discharge chute comprises a plurality of discharge chutes at longitudinally spaced positions along the shelf.

12. The device according to claim 11 wherein the chutes are arranged to be moveable together in elevation relative to the shelf to adjust spacing between the lower edge of the chutes and the shelf through actuation of a single lever.

13. The device according to claim 11 wherein each chute is suspended by a shaft extending downwardly therethrough, the shafts being rotatably supported on a common support member so as to be arranged for rotation with the respective chutes relative to the trough.

14. The device according to claim 13 wherein each chute includes a diametrically extending crossbar adjacent a bottom end thereof which connects the shaft to the chute.

15. The device according to claim 11 wherein each chute comprises a tubular member rotatably supported about a discharge pipe in communication with the hopper wherein a bottom end of the tubular member is spaced below a bottom end of the discharge pipe and wherein an interior dimension of the tubular member is greater than an upper dimension of the discharge pipe so as to be arranged for relative rocking movement between the tubular member and the pipe surrounded by the tubular member to agitate feed therein.

16. The device according to claim 11 wherein there is provided a divider member spanning laterally between opposing sides of the trough between each of the plurality of discharge chutes.

17. The device according to claim 16 wherein the divider members are suitably spaced so as to be arranged to allow no more than two piglets between any two adjacent divider members and so as to allow no more than one full grown hog between any two adjacent divider members.

18. The device according to claim 16 wherein each divider member is fixedly secured to each of the laterally opposed side edges of the trough and to the feed hopper thereabove.

19. A feeder device for feeding particulate feed to animals, the device comprising:

a trough having a base and laterally opposed side edges spaced upwardly from the base and extending in a longitudinal direction between opposing ends;

a feed shelf having side edges and being positioned to extend in the longitudinal direction spaced above the base of the trough;

the side edges of the trough being positioned laterally outwardly in relation to the side edges of the shelf so as to be arranged to capture feed falling from the feed shelf;

a space between the side edges of the trough and the side edges of the feed shelf being arranged for accommodating access to a head of one of the animals;

a feed hopper above the feed shelf and arranged for containing the particulate feed;

a plurality of discharge chutes, each extending downward from the hopper to a lower edge of the discharge chute and arranged for communicating the particulate feed therethrough to the feed shelf;

the plurality of discharge chutes being arranged to be supported in proximity to the feed shelf such that an angle of repose of the particulate feed from the lower edge of each discharge chute to the feed shelf prevents the particulate feed from falling from the feed shelf; and a water supply arranged for supplying water to the trough.

20. A feeder device for feeding particulate feed to animals, the device comprising:

a trough having a base and extending from the base to an upper edge spaced upwardly from the base;

a feed shelf having a outer edge positioned to extend above the base of the trough;

the upper edge of the trough being positioned laterally outwardly in relation to the outer edge of the shelf so as to be arranged to capture feed falling from the feed shelf;

a space between the upper edge of the trough and the outer edge of the feed shelf being arranged for accommodating access to a head of one of the animals;

a feed hopper above the feed shelf and arranged for containing the particulate feed;

at least one discharge chute extending downward from the hopper to a lower edge of the discharge chute and being arranged for communicating the particulate feed therethrough to the feed shelf;

said at least one discharge chute being arranged to be supported in proximity to the feed shelf such that an angle of repose of the particulate feed from the lower edge of discharge chute to the feed shelf prevents the particulate feed from falling from the feed shelf;

a water supply arranged for supplying water to the trough; and a level control arranged to control the water supply to maintain water level in relation to the trough at a set point level;

the level control being arranged to maintain the water level through a range of set point levels including a level which is below a lowermost point in elevation of the trough.

\* \* \* \* \*